United States Patent [19]
Tsuji et al.

[11] Patent Number: 6,104,102
[45] Date of Patent: Aug. 15, 2000

[54] MULTI-QUALITY ELECTRIC POWER SUPPLY APPARATUS

[75] Inventors: Kiichiro Tsuji, Minoo; Toshifumi Ise, Suita, both of Japan

[73] Assignee: Osaka University, Osaka, Japan

[21] Appl. No.: 09/365,221

[22] Filed: Jul. 30, 1999

[30] Foreign Application Priority Data

Feb. 4, 1999 [JP] Japan .................................. 11-027286

[51] Int. Cl.⁷ ........................................................ H02J 1/00
[52] U.S. Cl. .................................. 307/31; 307/64; 307/72
[58] Field of Search ................................. 307/64, 72, 75, 307/25, 31

[56] References Cited

U.S. PATENT DOCUMENTS

| | | | |
|---|---|---|---|
| 3,614,461 | 10/1971 | Speer | 307/64 |
| 5,210,685 | 5/1993 | Rosa | 363/109 |
| 5,513,090 | 4/1996 | Bhattacharya et al. | 363/40 |
| 5,514,915 | 5/1996 | Kim et al. | 307/64 |

*Primary Examiner*—Shawn Riley
*Attorney, Agent, or Firm*—Oliff & Berridge, PLC

[57] ABSTRACT

A multi-quality electric power supply apparatus supplies electric power based on the demand of various loads. The multi-quality electric power supply apparatus includes an inverter having a three-phase bridge configuration with an A/C output terminal connected to a distribution line of each phase of the three-phase four-wire A/C system. A capacitor is connected among two input terminals of the D/C side of the inverter and a neutral line of the three-phase four-wire A/C system. An uninterruptable power supply device is inserted from a node point to the distribution line of the inverter in a given distribution line of one phase on the load side to compensate for a voltage drop of the distribution line and to supply a given voltage in the distribution line during an interrupted power supply. A voltage drop compensation device is inserted from a node point to the distribution line of the inverter in another given distribution line of one phase on the load side, in order to compensate for the voltage drop of the distribution line, where each phase of the inverter is independently controlled and the electric power is supplied to the single phase load connected between the neutral line and each phase of the distribution line, respectively.

3 Claims, 2 Drawing Sheets

MULTI-QUALITY ELECTRIC POWER SUPPLY APPARATUS

BACKGROUND OF THE INVENTION

1. Field of the Invention

Present invention relates to a multi-quality electric power supply apparatus for supplying the electric power of the quality according to demand of various loads.

2. Related Art Statement

Electric energy is used widely because of easy handling, and now, the electric power supply is performed with very high quality. However, there are various loads, such as heating application etc, in which the quality is not demanded, but low-cost is required, and such as computer or the like, in which instantaneous voltage dip and service interruption cannot be allowed. Moreover, in recent years, according to spread of distributed electricity generating devices such as co-generation, micro turbines, photovoltaic generation and wind power generation, etc, and to tendency to deregulation in power generation, power transmission and distribution systems, the photovoltaic generation device or the like is set up in the home, and, in addition, the regenerative electric power from the distributed generation device comes to be supplied to the distribution system.

Therefore, as an idea with a new distribution system, the method of supplying the multi-quality electric power for supplying the electric power of the quality according to demand of load, is proposed from universities.

By the way, when the multi-quality electric power supply is carried out, the cost of the system to execute it becomes a problem. That is, if all routes to the customer from the power plant through the power transmission line and the distribution line, are provided in plural in accordance with the quality, the cost of the system increases extremely, and thus the cost of the electric power will increase accordingly, too.

Moreover, there is a fear of causing the voltage increase of the distribution line according to a reverse-flow and the frequency change in the system according as an increase of the distributed generation device. In addition, due to non-linear load, a harmonic current flows in the system, so that the voltage of the system becomes a tendency of distortion.

SUMMARY OF THE INVENTION

An object of the present invention is to solve various problems of the power distribution system.

Another object of the present invention is to provide a multi-quality electric power supply apparatus appropriately constituted so as to be able to economically supply the electric power according to the quality for the single phase load which particularly occupies the large majority of the load.

To achieve the above object, a multi-quality electric power supply apparatus is a multi-quality electric power supply apparatus comprising an inverter of three-phase bridge configuration having ac output terminal connected to a distribution line of each phase of three-phase four-wire AC system, a capacitor connected between two input terminals of DC side of the inverter and neutral line of the above three-phase four-wire ac system, respectively, an uninterrupted power supply means inserted from a node point to the distribution line of the inverter in a given distribution line of one phase on the load side, to compensate a voltage dip and service interruption of the distribution line and to supply a given voltage in the distribution line during interrupted power supply, and a voltage dip compensation means inserted from a node point to the distribution line of the inverter in another given distribution line of one phase on the load side, for compensating the voltage dip of the distribution line, whereby each phase of the above inverter is independently controlled, and the electric power with different quality is supplied to the single phase load connected between the neutral line and the each phase of the distribution line, respectively.

According to an embodiment of the invention unbalance and harmonics can be compensated for the distribution line of each phase by independently controlling each phase of the inverter, and the voltage dip and interrupted power can be compensated for the distribution line connected to the uninterrupted power supply apparatus and the voltage dip can be compensated for the distributed line connected to the voltage dip compensating means. Therefore, the electric power of the highest quality, i.e. premium power can be supplied in the distribution line, to which the uninterrupted power supply means is connected, the high quality power can be supplied in the distribution line to which the voltage dip compensating means is connected, and the normal quality power can be supplied in the distribution line of the remainder one phase.

According to the present invention, a multi-quality electric power supply apparatus comprising, an inverter of three-phase bridge configuration having AC output terminal connected to a distribution line of each phase of three-phase four-wire AC system, a capacitor and a secondary battery connected in parallel between two input terminals at DC side of the inverter and the neutral line of the above three-phase four-wire AC system, respectively; and a switching means inserted from a node point to the distribution line of the inverter in a given distribution line of one phase on the load side, for interrupting the distribution line during interrupted power supply, whereby each phase of the above inverter is independently controlled, and the electric power with different quality is supplied to the single phase load connected between the neutral line and the each phase of the distribution line, respectively.

According to another embodiment of the invention since the capacitor and the secondary batteries are connected between two input terminals of DC side of the inverter and neutral line of three-phase four-wire AC system, respectively, unbalance and harmonics can be compensated for and the regenerative electric power from distributed generation devices can be absorbed. Moreover, the premium power, i.e., the electric power of the highest quality, in which the voltage dip and the service interruption are compensated, can be supplied for the distribution line to which the switch means is connected, the electric power of the high quality by which the voltage dip is compensated, can be supplied to the distribution line of one phase in the other two phases, and the normal quality power can be supplied to the distribution line of the remainder one phase, by an easy constitution in which each phase of the inverter is controlled independently, without providing the uninterruptive power supply means and the voltage dip compensating means, independently.

According to yet another embodiment of the invention in the multi-quality electric power supply apparatus the switch means has a thyristor switch.

According to another embodiment of the invention there is an advantage in which the recovery operation after power recovery of the distribution line connected to the thyristor switch can be easily achieved by supplying the gate signal to the thyristor switch.

DETAILED EXPLANATION OF THE PREFERRED EMBODIMENT

Figure 1:
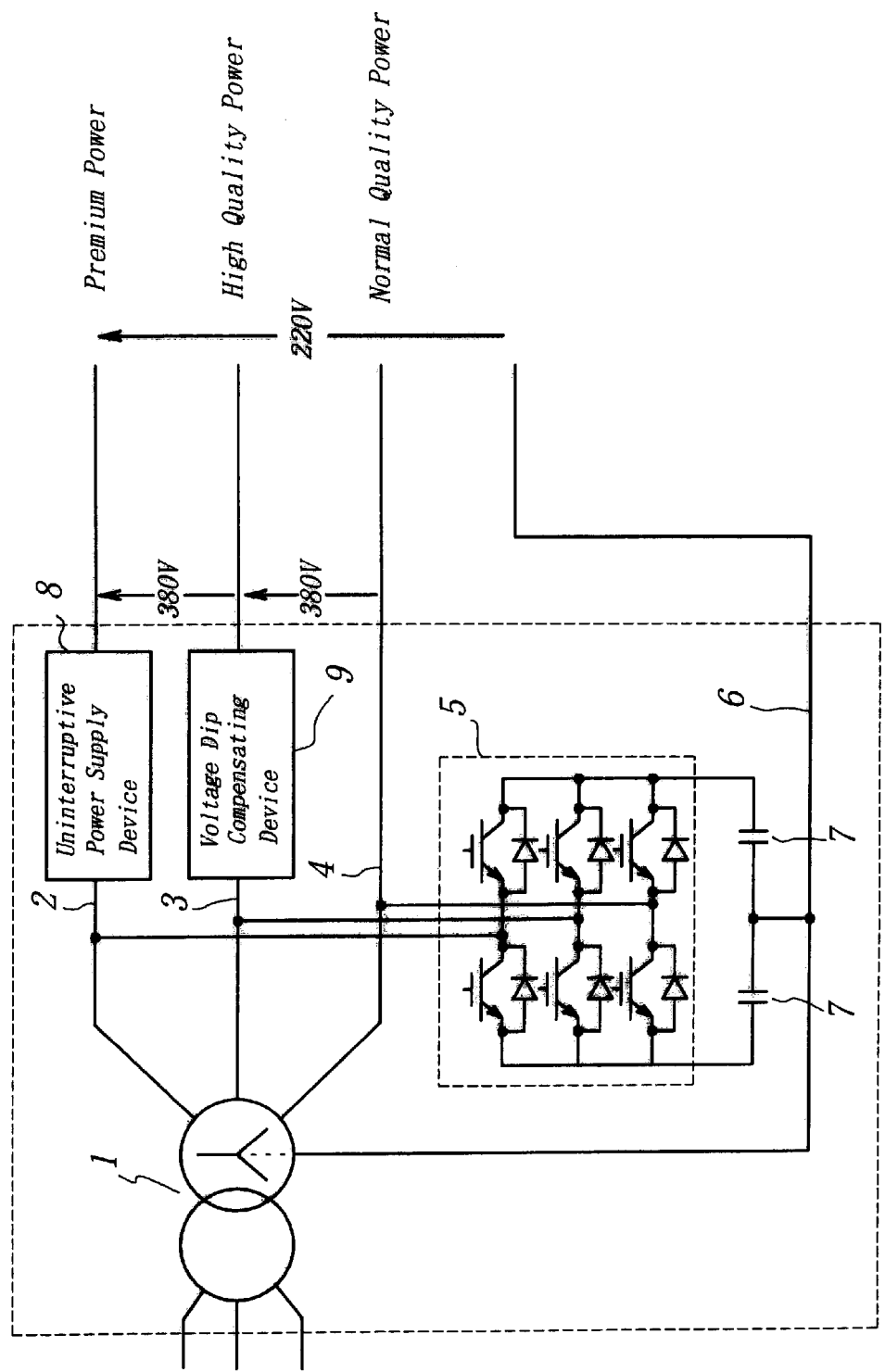
FIG. 1 is a circuit constitution of the substantial portion of first embodiment of the multi-quality electric power supply apparatus according to the present invention.

Now to the drawings, there are shown various embodiments of a multi-quality electronic power supply apparatus according to the present invention. Like parts are shown by corresponding reference characters throughout several views of the drawings.

Hereinafter, an embodiment of the present invention is explained referring to the drawing.

FIG. 1 is a circuit diagram showing the substantial portion of first embodiment of multi-quality electric power supply apparatus according to the present invention.

The multi-quality electric power supply apparatus supply the electric power according to the quality to the single phase load by the distribution system of the three-phase four-wire system from a transformer 1 and three-phase distribution lines 2, 3, and 4 of secondary sides of the transformer 1 are connected to each AC output terminal of an inverter 5 of three-phase bridge configuration which use the semiconductor switch. In the inverter 5, capacitors 7 and 7 are connected respectively between two input terminals of the DC side and a neutral line 6 of three-phase four-wire ac system.

Moreover, an uninterruptive power supply device 8 is connected from the node to distribution lines 2, 3, and 4 of the inverter 5 in distribution line 2 on the load side and a voltage dip compensating device 9 is connected to the distribution line 3, respectively. The uninterruptive power supply device 8 uses the one of constitution having for example the rectifier, the secondary battery, and the inverter, and the voltage dip compensating device 9 uses the one of constitution having the capacitor and the series inverter. The inverter 5, the uninterruptive power supply device 8 and the voltage dip compensating device 9 are controlled by using the output voltage of the uninterruptive power supply device 8. Moreover, in FIG. 1, there are shown an interphase voltage as 380V and each phase voltage using neutral line as 220V.

According to the multi-quality electric power supply apparatus shown in FIG. 1, unbalance among three phases can be compensated by independently controlling each phase of the inverter 5, the premium power, to which voltage dip and the power failure are compensated by the uninterruptive power supply device 8, can be supplied for the distribution line 2 while compensating harmonics, the high quality power, to which voltage dip is compensated by the voltage dip compensating device 9, can be supplied for the distribution line 3, and the normal quality power can be supplied for the distribution line 4. Moreover, when the service interruption is compensated, the inverter 5 is cut off by making the semiconductor switch corresponding to each phase off condition from the system.

Figure 2:
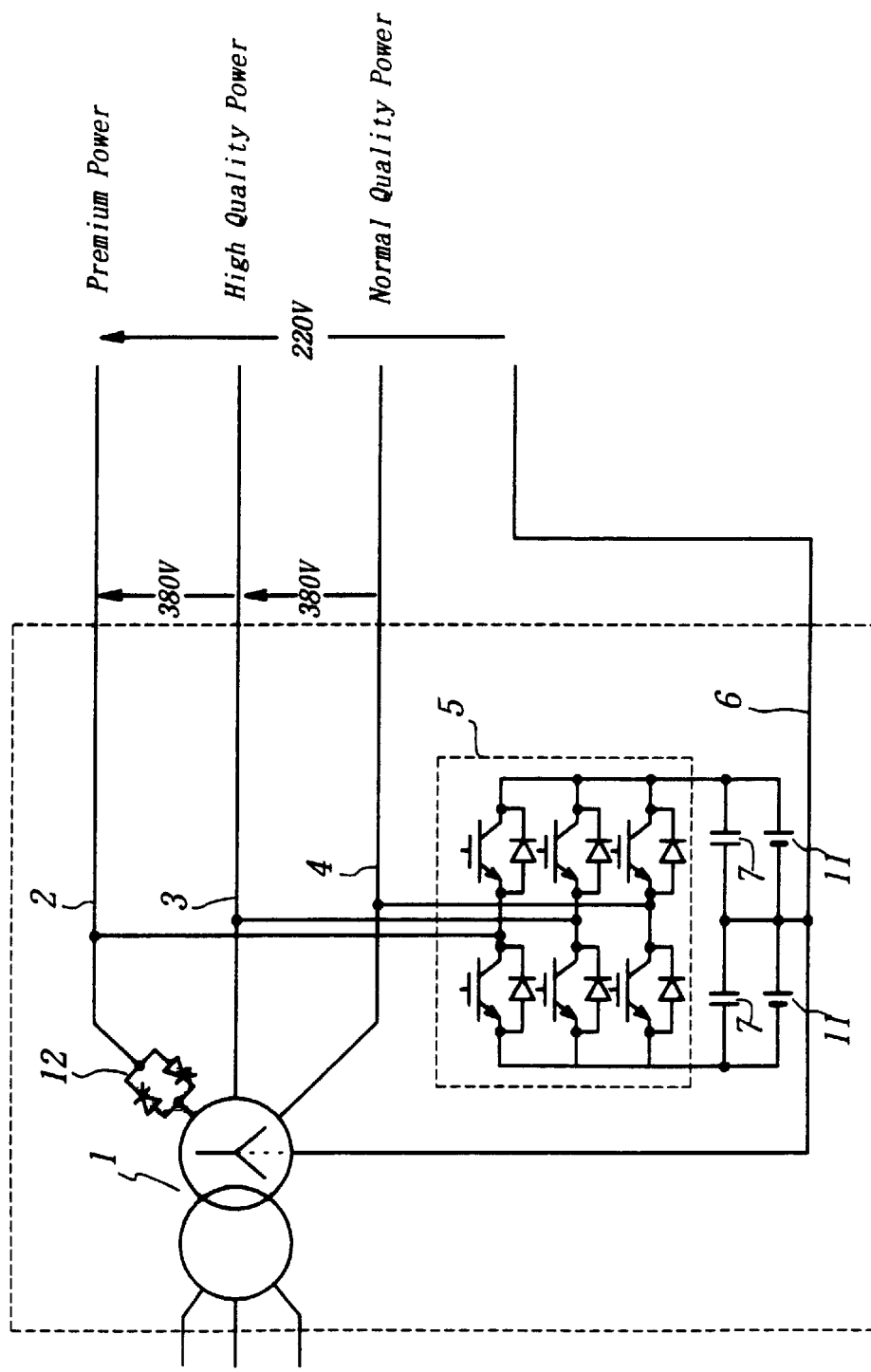
FIG. 2 is a circuit constitution of the substantial portion of the second embodiment of the multi-quality electric power supply apparatus according to the present invention.

FIG. 2 is a circuit diagram showing the substantial portion of second embodiment of the multi-quality electric power supply apparatus according to the present invention. The multi-quality electric power supply apparatus will absorb the regenerative electric power generated by the distributed generation devices set up in the home etc. Therefore, in this embodiment, the AC output terminal of the inverter 5 of three phase bridge configuration is connected to the three phase distribution lines 2, 3, and 4 on the second side of the transformer 1, and capacitors 7, 7, and the secondary battery 11, 11 are connected among two input terminals on the DC side of the inverter 5 and the neutral line 6 of the three-phase four-wire AC system, respectively. Moreover, a thyristor switch 12 as the switch means is provided on the side of the transformer 1 rather than the node point of the inverter 5 in the distribution line 2 to which the premium power is supplied. The inverter 5 and the thyristor switch 12 are controlled by using the output voltage of the distribution line 2 to which the premium power is supplied.

In this way, the inverter 5 compensates for the unbalance among the harmonics and three phases by independently controlling each phase of the inverter 5, the premium power by which the voltage dip and the service interruption are compensated, is supplied for the distribution line 2 while absorbing the regenerative electric power, so as to control a reverse-flow by the secondary batteries 11 and 11, and the high quality power by which the voltage sag is compensated, is supplied for the distribution line 3, the normal quality power is supplied for the distribution line 4. Moreover, in this embodiment, the thyristor switch 12 is made off condition at service interruption compensation, (usual driving state is on condition), the inverter 5 continues the switching control as for the semiconductor switch of the phase corresponding to the distribution line 2, and the semiconductor switches of other phases are made cut off from the system.

According to the second embodiment, the capacitor 7 and the secondary batteries 11 are connected in parallel among two input terminals on the DC side of the inverter 5 and the neutral line 6, respectively, the unbalance, the harmonics compensation, and the voltage dip compensation are effected by independently controlling each phase of the inverter 5, and thus the constitution and the control can be made easier than the first embodiment shown in FIG. 1, since the regenerative power absorption function and the uninterruption power supply function are given, and thus the whole can be made economically.

As described above, when the AC system of the three-phase four-wire system is used, the inverter having the capacitor, uninterruptive power supply means and the voltage dip compensating means are connected in the distribution system. While compensating for the unbalance and the harmonics with simple and economical constitution by independently controlling each phase of the inverter, the premium power by which voltage dip and service interruption are compensated, the high quality power by which voltage dip is compensated, and the normal quality power can be supplied for, respectively.

Moreover, when the AC of three-phase four-line system is used, the inverter having the capacitor and the secondary battery and the switching means are connected in the power distribution system. The regenerative electric power from the distributed generation devices is absorbed by an easier, more economical constitution by independently controlling each phase of the inverter, and, while compensating for the unbalance and the harmonics, the premium power by which voltage dip and service interruption are compensated, the high quality power by which voltage sag is compensated, and the normal quality power can be supplied, respectively.

What is claimed is:

1. A multi-quality electric power supply apparatus comprising: an inverter of three-phase bridge configuration having AC output terminal connected to a distribution line of each phase of three-phase four-wire AC system; a capacitor connected among two input terminals of DC side of the inverter and neutral line of the above three-phase four-wire AC system, respectively; an uninterrupted power supply means inserted from a node point to the distribution line of the inverter in a given distribution line of one phase on the load side, to compensate a voltage dip and service interruption of the distribution line and to supply a given voltage in the distribution line during interrupted power supply; and a voltage dip compensation means inserted from a node point to the distribution line of the inverter in another given distribution line of one phase on the load side, for compensating the voltage dip of the distribution line; whereby each phase of the above inverter is independently controlled, and the electric power with different quality is supplied to the single phase load connected between the neutral line and the each phase of the distribution line, respectively.

2. A multi-quality electric power supply apparatus comprising: an inverter of three-phase bridge configuration having AC output terminal connected to a distribution line of each phase of three-phase four-wire AC system; a capacitor and a secondary battery connected in parallel among two input terminals at DC side of the inverter and the neutral line of the above three-phase four-wire AC system, respectively; and a switching means inserted from a node point to the distribution line of the inverter in a given distribution line of one phase on the load side, for interrupting the distribution line during interrupted power supply; whereby each phase of the above inverter is independently controlled, and the electric power with different quality is supplied to the single phase load connected between the neutral line and the each phase of the distribution line, respectively.

3. A multi-quality electric power supply apparatus as claimed in claim 2, wherein the above switch means has a thyristor switch.

* * * * *